United States Patent [19]

Lange

[11] Patent Number: 4,770,430
[45] Date of Patent: Sep. 13, 1988

[54] SELF-STEERING AXLE ASSEMBLY FOR VEHICLES

[76] Inventor: Dennis M. Lange, 18328 Spring St., Union Grove, Wis. 53182

[21] Appl. No.: 84,626

[22] Filed: Aug. 11, 1987

[51] Int. Cl.$^4$ .............................................. B62D 61/12
[52] U.S. Cl. ................................. 280/81 A; 280/81.5; 280/405 R; 280/661
[58] Field of Search .................. 280/81.5, 81 A, 81 R, 280/80 R, 80 A, 661, 704, 405 R, 405 A

[56] References Cited

U.S. PATENT DOCUMENTS

| | | | |
|---|---|---|---|
| 2,847,228 | 8/1958 | Hall | 280/81 A |
| 3,704,896 | 12/1972 | Buelow | 280/81 A |
| 3,880,440 | 4/1975 | Tidewell | 280/81 A |
| 4,084,833 | 4/1978 | Mohrbacker et al. | 280/81 A |
| 4,195,856 | 4/1980 | Larson et al. | 280/704 |
| 4,373,738 | 2/1983 | Lange | 280/81.5 |
| 4,449,727 | 5/1984 | Roos | 280/81 A |

Primary Examiner—Richard A. Bertsch
Attorney, Agent, or Firm—Michael, Best & Friedrich

[57] ABSTRACT

The self-steering axle assembly includes a transverse axle member extending below the vehicle frame, either forwardly or rearwardly of the vehicle rear wheels, a king pin assembly on each of the opposite, outer end portions of the axle member, a wheel rotatably mounted on each of the king pin assemblies for steering movement and a tie rod interconnecting the wheels so they steer together. The axle member is supported from the vehicle frame for pivotal movement of the king pin assemblies relative to the frame between a forward position wherein the longitudinal axes of the king pin assemblies are upwardly inclined in a rearward direction at a forward angle of less than about 30° relative to a vertical plane passing through the rotational axes of the wheels and a reverse position wherein the longitudinal axes are upwardly inclined in a forward direction at an angle of less than about 30°. The king pin assemblies are selectively moved between the forward position for forward movement of the vehicle and the reverse position for backing, so that the wheels track vehicle movement in both directions.

18 Claims, 4 Drawing Sheets

SELF-STEERING AXLE ASSEMBLY FOR VEHICLES

BACKGROUND OF THE INVENTION

This invention relates to axle assemblies for over-the-road vehicles such as trucks and, in one aspect, to self-steering axle assemblies which can serve either as primary axle assemblies or auxiliary axle assemblies for providing an additional load bearing axle when required to meet highway regulations.

Auxiliary axle assemblies are commonly used for load distribution purposes on trucks for hauling heavy loads, both tractor-trailer combinations and trucks. When deadheading, hauling a light load or a tractor is driven alone, such auxiliary axle assemblies typically are arranged so that they can be raised out of contact with the ground to eliminate unnecessary tire wear.

In many instances, the applicable government regulations require the auxiliary axle to be spaced some distance from the rear or drive wheels. Such spacing can cause a lateral slippage or tire scuffing when curves or corners are being negotiated. This problem can be minimized by making the auxiliary axle wheels steerable, such as by mounting the wheels on king pin assemblies and connecting the king pin assemblies together with a tie rod or the like so that the wheels turn together. Prior auxiliary axle assembly constructions including such an arrangement are exemplified in Lange U.S. Pat. No. 4,373,738 and Buelow U.S. Pat. No. 3,704,896.

Prior steerable axle assemblies tend to turn in the wrong direction during vehicle backing. For axle assemblies located in front of the vehicle drive wheels, the wheels tend to become turned to the left when the vehicle is being backed with the front wheels turned to the right and vice versa. For auxiliary axle assemblies located behind the vehicle drive wheels, the wheels tend to become turned in the same direction as the front wheels during backing, instead of following the rear wheels. Consequently, the auxiliary axle should be raised to avoid tire scuffing.

Lange U.S. Pat. No. 4,373,738 discloses connecting the auxiliary axle with the vehicle front wheels through a fluid-actuator system which is operable to steer the auxiliary axle wheels in response to steering movement of the vehicle front wheels. Such an arrangement is quite complex and unreliable.

Semi-truck tractors and some trucks, such as concrete-mixer trucks, commonly have tandem drive axles. The turning axle for such tractors and trucks typically is at the mid point of one axle or at a location between the axles. Consequently, when negotiating a curve or turning a corner, the tires on one or both of the axles slip sideways, causing scuffing.

SUMMARY OF THE INVENTION

An object of the invention is to provide a self-steering axle assembly which can be operated with a minimum of tire wear.

Another object of the invention is to provide a self-steering axle assembly which is arranged so that the wheels can properly follow vehicle movement, both during normal operation and backing.

A further object of the invention is to provide such a self-steering axle assembly which is arranged so that the wheels can be conveniently changed between forward and reverse positions.

A still further object of the invention is to provide a self-steering axle assembly as described in the immediately preceding paragraph in which the wheels are automatically moved between the forward and reverse positions in response to shifting the vehicle transmission or in response to a change in the rotational direction of the wheels.

Other objects, aspects and advantages of the invention will become apparent to those skilled in the art upon reviewing the following detailed description, the drawings and the appended claims.

The self-steering axle assembly provided by the invention includes a transverse axle member extending below and supported from a vehicle frame, a king pin assembly mounted on each of the outer end portions of the axle member, a wheel mounted on each of the king pin assemblies for rotation about a transverse axis and for steering movement and means interconnecting the wheel so they steer together, such as a tie rod. The axle includes a pivot means for affording pivotal movement of the king pin assemblies relative to the vehicle frame between a forward position wherein the longitudinal axes thereof are upwardly inclined in a rearward direction at a forward angle and a reverse position wherein the longitudinal axes are upwardly inclined in a forward direction at a reverse angle. The forward and reverse angles are less than about 30° to a vertical plane passing through the rotational axes of the wheels. The king pins are selectively moved between the forward position for forward movement of the vehicle and the reverse position for backing so that the wheels track vehicle movement in both directions.

In one embodiment, the axle member is supported from the vehicle frame for pivotal movement relative to the vehicle frame about a transverse axis and the king pin assemblies are moved between the forward and reverse positions by a fluid-operated actuator, such as a air cylinder, supported from the vehicle frame and operably connected to the axle member for pivoting the axle member in opposite directions.

In one embodiment, operation of the actuator is controlled by a control system including a solenoid-operated valve for controlling the supply of pressurized fluid to the actuator and an electrical circuit having a selector switch connected to a source of electrical power and the valve solenoid and movable between a forward position to cause the actuator to move the axle member and the king pin assemblies to the forward position and a reverse position to cause the actuator to move the axle member and the king pin assemblies to the reverse position.

The selector switch can be operated in response to shifting the vehicle transmission between forward and reverse, by a remote lever moved by an operator, either directly of through an actuation means, or by a sensing system which senses the rotational direction of the wheels and transmit a signal for moving the selector switch.

DESCRIPTION OF THE PREFERRED EMBODIMENTS

The invention can be used on stationary axle assemblies fixably supported from the vehicle frame or auxiliary axle assemblies which are pivotally supported from the vehicle frame and can be raised and lowered as the need dictates. The invention will be described in connection with the latter type axle assembly.

Figure 1:
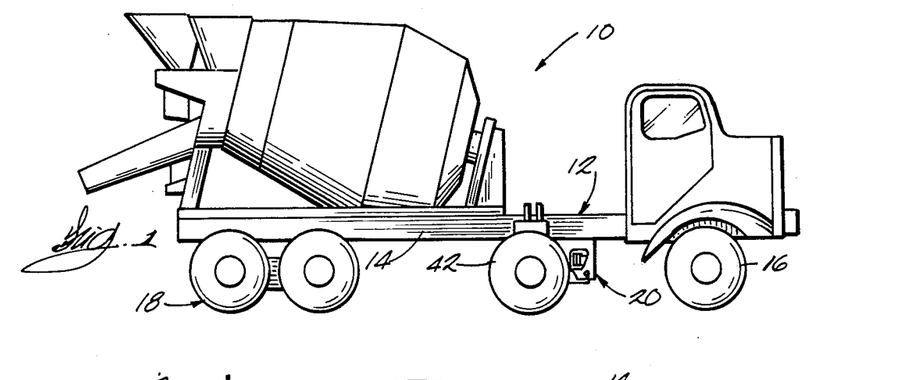
FIG. 1 is a side elevational view of a concrete-mixer truck including an auxiliary axle assembly embodying the invention with the auxiliary axle located forwardly of the drive wheels and shown in an operating position.

Illustrated in FIG. 1 is a concrete-mixer truck 10 having a chassis 12 including a pair of laterally-spaced, longitudinally-extending frame members 14. The chassis 12 is supported for travel over the ground by front steering wheels 16 and rear wheels 18 mounted on a conventional tandem axle arrangement which is connected to the frame members 14 via a conventional suspension system. The rear wheels 18 are driven by a drive shaft (not shown) in the usual manner.

Mounted on the chassis 12 forwardly of the rear wheels 18 is an auxiliary axle assembly 20 embodying the invention. The auxiliary axle assembly 20 includes a pair of laterally spaced, rearwardly extending, generally L-shaped arms 22 (one shown in FIGS. 2, 4 and 5), each including a first or horizontal leg 24 having an outer or rear end 26 which supports a transversely extending axle member 28 as described in more detail below and a second or vertical leg 30. Each of the arms 22 is pivotally mounted at the juncture 32 between the horizontal and vertical legs on laterally-spaced, longitudinally-extending side members 33 on a support bracket 34 which extends downwardly from and is affixed to each frame member 14. The arms 22 and the axle member 28 are movable between an operating position and a retracted position as described below.

While the axle member 28 can be substantially straight, it preferably (FIG. 3) is generally U-shaped and includes a central portion 36 which extends laterally between the frame members 14 and opposite outer end portions 38 which are upwardly offset from the central portion 36. Mounted on each outer end portion 38 is a king pin assembly 40 supporting an auxiliary wheel 42 for rotation about a transverse axis 44.

Figure 3:
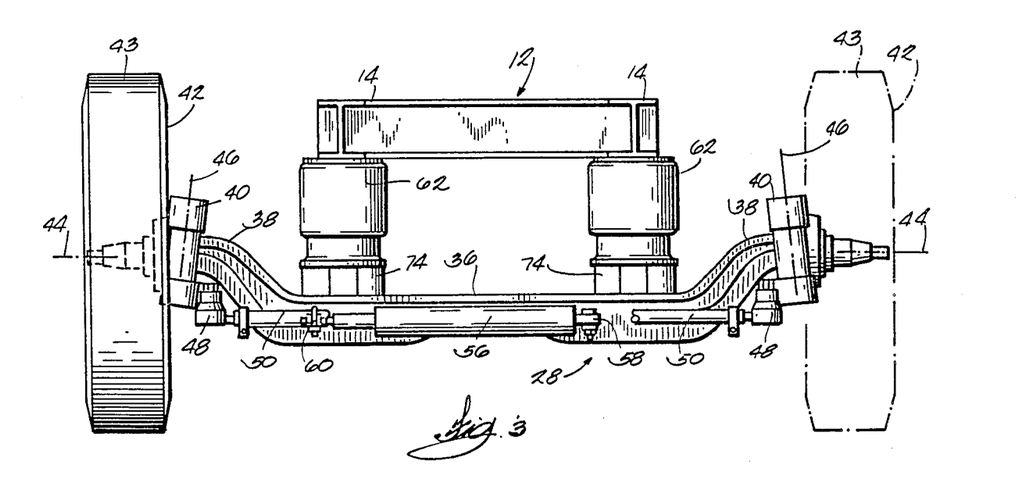
FIG. 3 is a fragmentary, sectional view taken generally along line 3—3 in FIG. 2.

The king pin assemblies 40 are arranged to permit steering movement of the wheels 42. That is, each king pin assembly 40 has a longitudinal pivot axis 46 and the respective wheel 42 is free to pivot about that axis relative to the axle member 28. Each king pin assembly 40 includes a steering arm or link 48. The steering links 48 are interconnected by a tie rod 50 so that the wheels 42 turn together, i.e., are self steering. The tie rod 50 preferably is located behind the king pin assemblies as illustrated and the pivotal connections with the steering links 48 are located relative to the turning axis of the truck in accordance with the Ackerman theory.

The self-steering axle wheels 42 generally follow the front wheels 16 when corners or curves are being negotiated, thereby minimizing scuffing of the tires 43. In order for the wheels 42 to best track the front wheels 16 during forward travel, the king pin assemblies 40 are at a positive caster. That is they are positioned so that the longitudinal axes 46 are upwardly inclined in a rearward direction at an acute angle to a vertical plane (represented by line 52 in FIG. 2) passing through the rotational axes 44 of the auxiliary wheels 42.

Damping means preferable are provided for minimizing flutter or shimmy of the auxiliary wheels 42. A suitable damping means is disclosed in Lange U.S. Pat. No. 4,373,738 which is incorporated herein by reference. More specifically, a hydraulic cylinder 56 including internal orifices is connected at one end to the axle member 28 at 58 and at the opposite end to the tie rod at 60. The cylinder 56 also serves to return the auxiliary wheels 42 to a centered or straight-ahead position in the event the auxiliary wheel assembly 20 is moved from the operating position to the retracted position with the auxiliary wheels 42 turned.

The axle member 28 is supported from the frame members 14 by a pair of conventional air bags or springs 62, each mounted between a frame member 14 and the axle member 28. The air springs 62 are air-tight, bellows-like rubber elements and the interiors thereof are connected to a source of compressed air through a suitable air supply system including a control (not shown) for selectively pressurizing and de-pressurizing the air springs 62. When pressurized, the air springs 62 urge the axle member 28 downwardly to bring the wheels 42 into engagement with the ground and thereby transport a portion of the load from the rear wheels 18 onto the auxiliary wheels 42.

Figure 2:
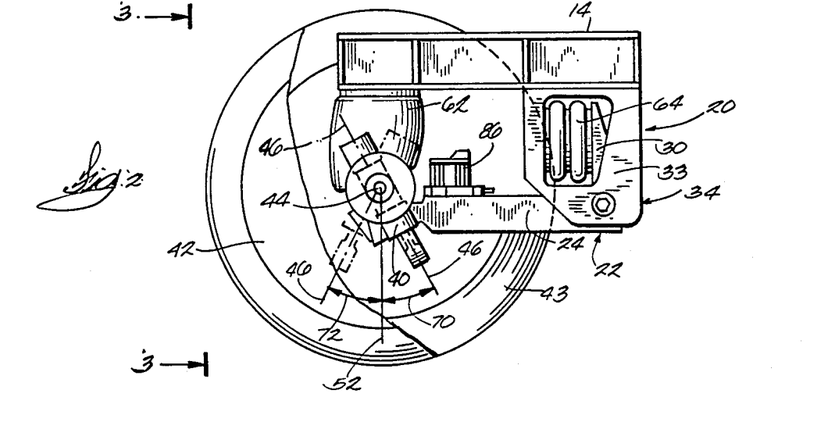
FIG. 2 is an enlarged, fragmentary, side elevational view of the auxiliary axle assembly shown in the operating position.
Figure 4:
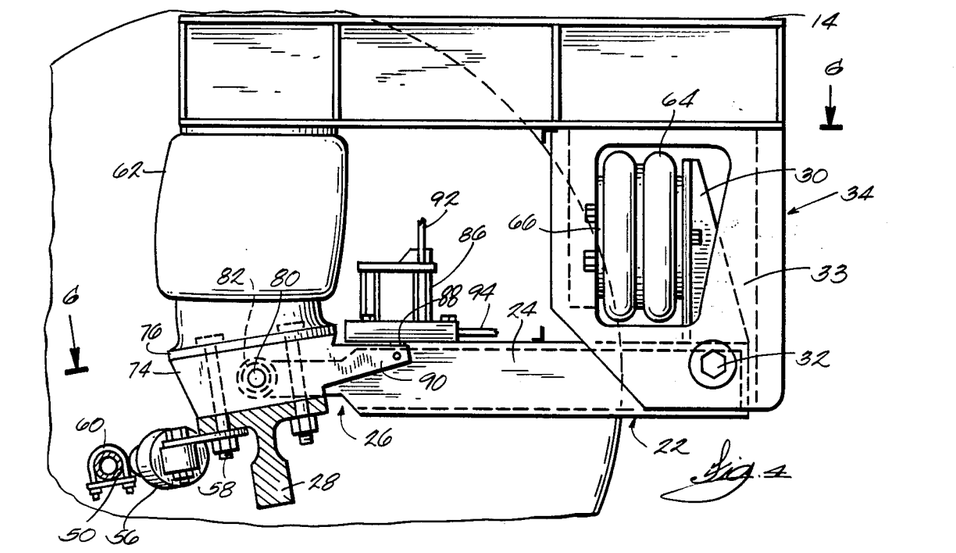
FIG. 4 is a further enlarged, fragmentary, side elevational view of the auxiliary axle assembly shown in the operating position.
Figure 5:
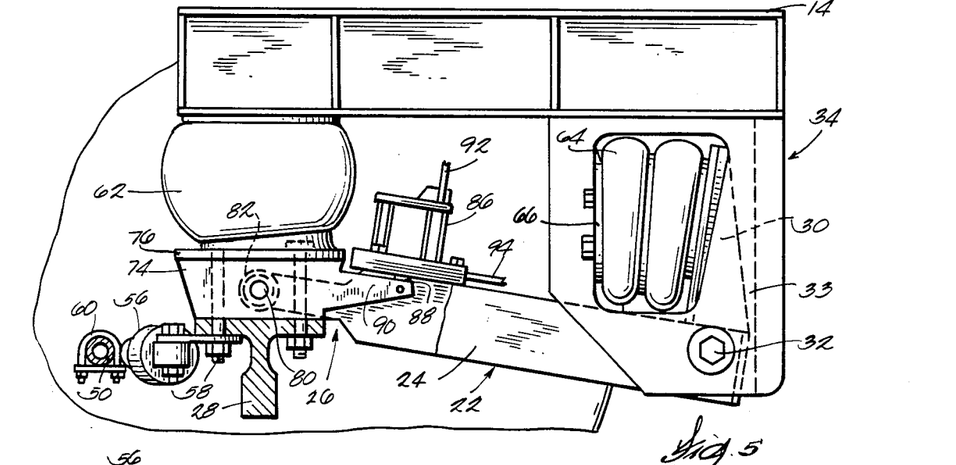
FIG. 5 is a view similar to FIG. 4 showing the auxiliary axle assembly in the retracted position.
Figure 6:
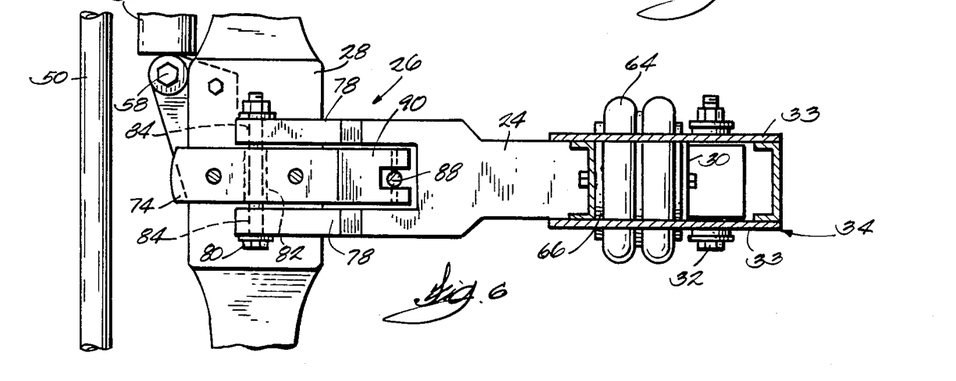
FIG. 6 is a fragmentary, sectional view taken generally along line 6—6 in FIG. 4.

Means are provided for moving the axle member 28 between the operating position shown in FIGS. 2 and 4 wherein the tires 43 are in engagement with the ground and the retracted position shown in FIG. 5 wherein the auxiliary wheels 42 are raised above the ground. While various suitable means can be used for this purpose, in the specific construction illustrated, such means includes an air bags or springs 64, similar to but smaller than the air springs 62 (one shown) mounted between the vertical leg 30 of each arm 22 and a laterally extending end member 66 on the support bracket 34. Like the air springs 62, the interior of the smaller air springs 64 are connected to a source of compressed air through the air supply system.

To raise the axle member 28 and the wheels 42 to the retracted position, the larger air springs 62 are de-pressurized and the smaller air springs 64 are pressurized.

The expansion of the smaller air springs 64 causes the arms 22 to rotate in a clockwise direction as viewed in FIGS. 2, 4 and 5, thereby moving the axle member 28 and the wheels 42 to the retracted position. The axle member 28 and the wheels 42 are moved to the operating position by de-pressurizing the smaller air springs 64 and pressurizing the larger air springs 62.

When the axle member 28 is U-shaped as illustrated, it can be raised to a location where the central portion 36 is against or immediately adjacent the bottom edges of the frame members 14 and the outer end portions 38 are located above the bottom edges of the frame members 14. Thus, the rotational axes 44 of the wheels 42 are located above the bottom edges of the frame members 14, thereby maximizing the above-the-ground clearance of the wheels 42. This capability is particularly advantageous for situations where the truck 10 is driven over uneven ground, such as at construction sites, with the auxiliary axle assembly 20 in the retracted position. The axle member 28 can be substantially straight as mentioned above.

While the wheels 42 track the front wheels 16 when the truck 10 is moving forward, they normally will not track when the truck is moving backward. Consequently, it usually is necessary to raise the auxiliary axle assembly 20 to the retracted position before backing.

In accordance with the invention, this problem is obviated by providing means for affording pivotal movement of the king pin assemblies 40 relative to the vehicle frame members 14 between a forward travel position or positive caster illustrated by the solid lines in FIG. 2 and a reverse travel position or negative caster illustrated by the dashed lines in FIG. 2. When the king pin assemblies 40 are in the forward position, the longitudinal axes are upwardly inclined in a rearward direction at a forward angle represented by reference numeral 70, with the bottoms of the king pin assemblies 40 closer to the front of the truck. When the king pin assemblies are in the reverse position, the longitudinal axes 46 are upwardly inclined in a forward direction at a reverse angle represented by reference numeral 72 with the bottoms of the king pin assemblies 40 closer to the rear of the truck. While various means can be used for this purpose, in the specific construction illustrated, such means includes an adapter 74 located between and fixably mounted on a lower flange 76 of each larger air spring 62 and the axle member 28. The rear ends of the arms 22 are generally U-shaped and have laterally spaced extensions 78. Each adapter 74 is located in the space between the extensions 78 of the respective arm 22 and is mounted for pivotal movement relative to the respective arm 22 by a bolt or pin 80 extending through a bearing 82 in the adapter 74 and apertures 84 in the extensions 78.

Means are provided for selectively moving the king pin assemblies 40 between the forward and reverse positions. While various suitable means can be used for this purpose, in the specific construction illustrated, such means includes an actuator or air-operated cyclinder 86 mounted on the horizontal leg 24 of each arm 22 and having a reciprocative piston (not shown) carrying a piston rod 88 which is pivotally connected to the outer end of a forwardly extending extending lever arm 90 on the adapter 74. The operation of only one cylinder 86 will be described.

Pressurized air is selectively supplied to the base end of the cylinder 86 through a conduit 92 to extend the piston rod 88 and is selectively supplied to the rod end of the cylinder 86 through a conduit 94 to retract the piston rod 88. Extension of the piston rod 88 pivots the adapter 74, the axle member 28 and the king pin assemblies 40 relative to the arms 22 (in a clockwise direction as viewed in FIGS. 2, 4 and 5) toward the reverse position. Retraction of the piston rods 88 pivots the adapter 74, the axle member 28 and the king pin assemblies 40 relative to the arms 22 (in a counterclockwise direction as viewed in FIGS. 2, 4 and 5) toward the forward position. The forward and reverse angles 70 and 72 are less than about 30° to the vertical plane 52 and preferably are within the range of about 3° to about 15°.

Figures 7, 8:
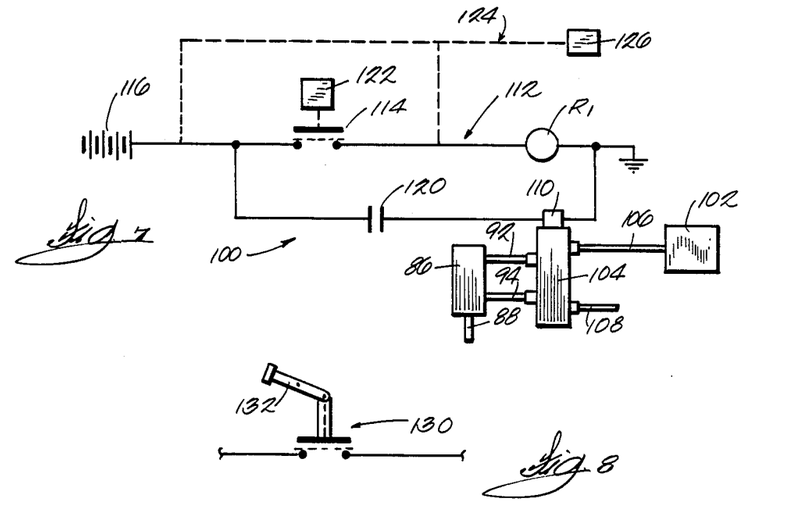
FIG. 7 is a schematic illustration of the control system.
FIG. 8 is a schematic illustration of an alternate arrangement for the electrical circuit portion of the control system.

Operation of the air cylinder 86 is controlled in a suitable manner to provide the desired orientation of the king pin assemblies 40. FIG. 7 schematically illustrates a system 100 for automatically controlling the operation of the air cylinder 86. For the sake of brevity, only the portion of the control system for operating one air cylinder 86 is illustrated and will be described.

The control system 100 includes a source of compressed air 102, such as a tank or an engine-driven pump, a solenoid-operated, four-way valve 104 connected to the source 102 via a conduit 106 and connected to the air cylinder 86 via conduits 92 and 94. The valve 104 is movable between first and second positions. When pressurized air is supplied to the rod end of the air cylinder 86 via conduits 106 and 94, the piston rod 88 is retracted and air is exhausted from the base end to the atmosphere through the conduit 92 and a port 108 in the valve 104. When pressurized air is supplied to the base end of the air cylinder 86 via the conduits 106 and 92, the piston rod 88 is extended and air in the rod end is exhausted from the rod end to atmosphere via the conduit 94 and the port 108. The valve 104 is biased toward the first position and is moved to the second position in response to energization of its solenoid 110.

The control system 100 has an electrical control circuit 112 including a selector switch 114 connected to a source of electrical power 116 such as the vehicle battery or alternator. the selector switch 114 is movable between an open or forward position illustrated by the solid lines in FIG. 7 and a closed or reverse position illustrated by the dashed line in FIG. 7. When the selector switch 114 is in the forward position, the valve 104 is in the first position and the air cylinder piston rod 88 is retracted to move the king pin assemblies 40 to the forward position. When the selector switch 114 is moved to the reverse position, a relay R1 is energized to close its normally open contacts 120 and the valve solenoid 110 is energized to move the valve 104 to he second position and the air cylinder piston rod 88 is extended to move the king pin assemblies 40 to the reverse position. If the auxiliary axle tires 43 are lowered into engagement with the ground at this time, the axle member 28 may not actually pivot from the forward position to the reverse position until initial backing movement of the truck.

Means are provided for moving the selector switch 114 between the forward and reverse positions. While various suitable means can be used for this purpose, in the specific construction illustrated by solid lines in FIG. 7, the selector switch 114 is operably connected to the shifting mechanism of the vehicle transmission 122 in a suitable manner, either electrically or mechanically, such that the selector switch 114 is moved to the forward position in response to the transmission being shifted to a forward drive position and is moved to the reverse position in response to the transmission being shifted into reverse.

In the embodiment schematically illustrated by dashed lines in FIG. 7, the relay R1 is interconnected with the truck lighting system 124 so that it is energized in response electrical power being supplied to the truck back up lights 126 and is de-energized when the transmission is shifted out of reverse. In this embodiment, the relay contacts 120 act as a selector switch with their normally open position being the forward position and their closed position being the reverse position. The selector switch 114 can be deleted, in which case the terminals for the relay coil and the contacts 120 are connected to the power supply by separate wires.

In the embodiment schematically illustrated in FIG. 8, the selector switch 130 is operably connected to a remote lever 132 located inside the truck cab or other convenient location. The selector switch 130 is moved between the forward and reverse positions in response to movement of the lever 132 by an operator, either directly or through a suitable actuation means.

Figure 9:
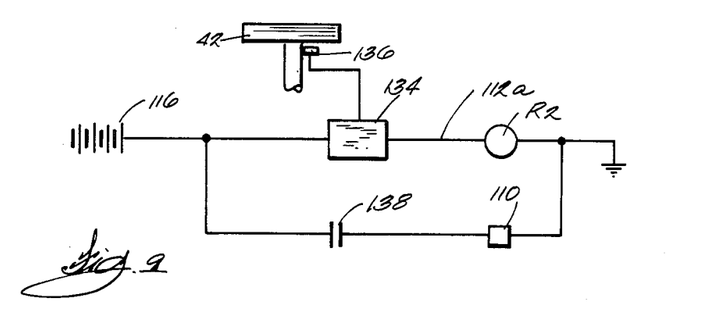
FIG. 9 is a schematic illustration of another alternate arrangement for the electrical circuit portion of the control system.

In the embodiment schematically illustrated in FIG. 9, the electrical circuit 112a of the control system includes an electronic sensing system 134 including a pickup 136 mounted on one of the auxiliary wheels 42 for sensing rotational direction. The sensing system 134 is arranged to produce an electrical output only when the auxiliary wheels 42 are rotating in the reverse direction. This signal energizes a relay R2 to close its contacts 138 and the valve solenoid 110 is energized to move the valve 104 to the second position as described above. Thus, the the contacts of relay R2 acts as a selector switch similar to the contacts of relay R1 in the embodiment described above.

Figure 10:
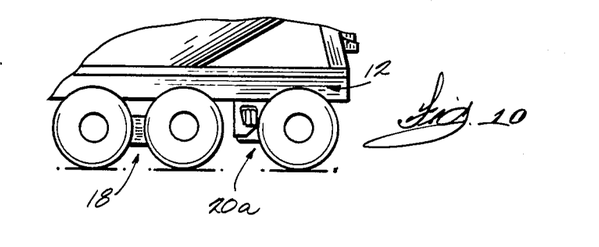
FIG. 10 is a fragmentary, side elevational view of a truck incorporating an auxiliary axle assembly located at the rear of the truck.

In the embodiment illustrated in FIG. 10, the auxiliary axle assembly 20a is constructed and operates in substantially the same manner as the embodiment illustrated in FIGS. 1-6, except that it is mounted on the rear of the truck chassis 12, the axle member 28 and the wheels 42 are located behind the rear drive wheel 18 and the tie rod is located in front of the king pin assemblies. The invention also can be used on auxiliary axle assemblies which are connected to and trail behind the truck chassis.

Figure 11:
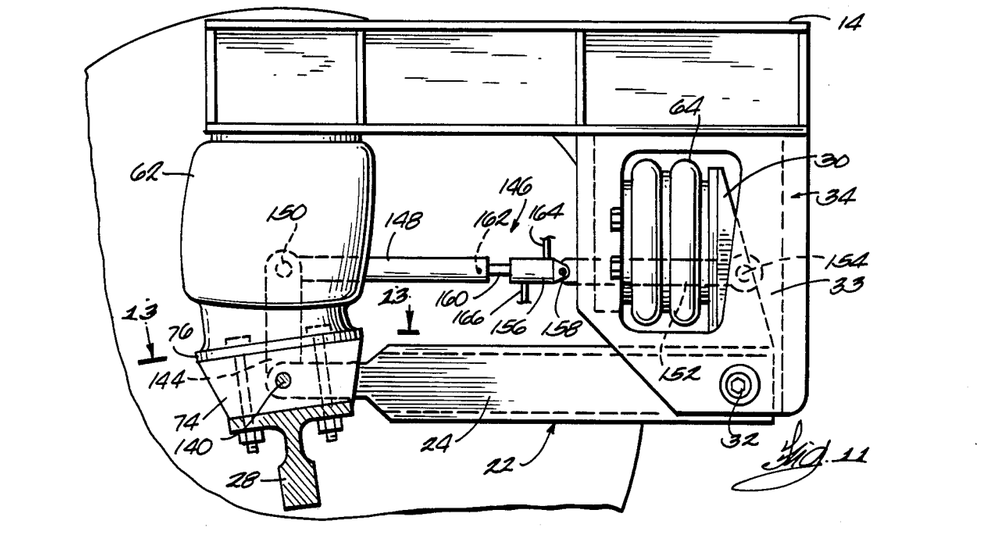
FIG. 11 is an enlarged, fragmentary, side elevational view of an auxiliary axle assembly including an alternate arrangement for mounting the axle on the vehicle frame and for moving the king pin assemblies between the forward and reverse positions, moving the axle assembly in the operating position.
Figure 12:
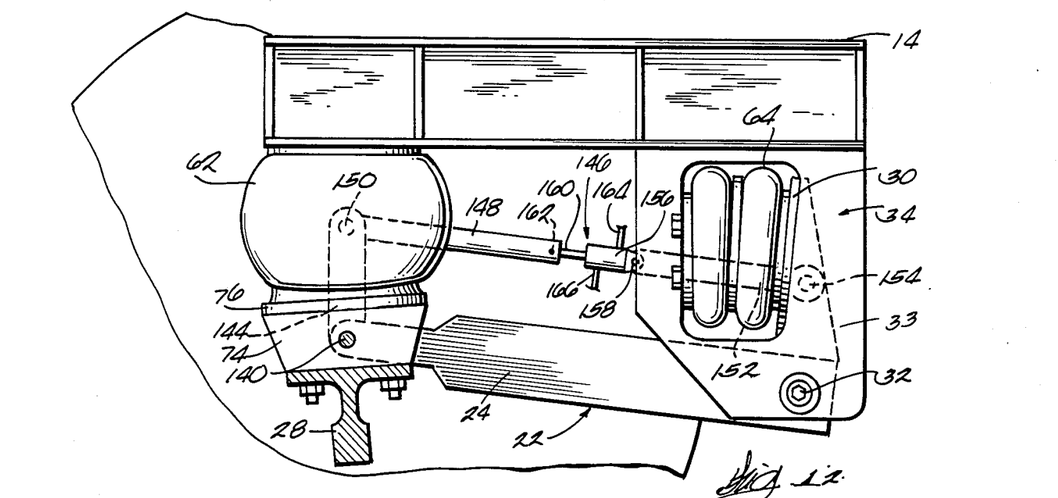
FIG. 12 is a view similar to FIG. 11 moving the axle assembly in the retracted position.
Figure 13:
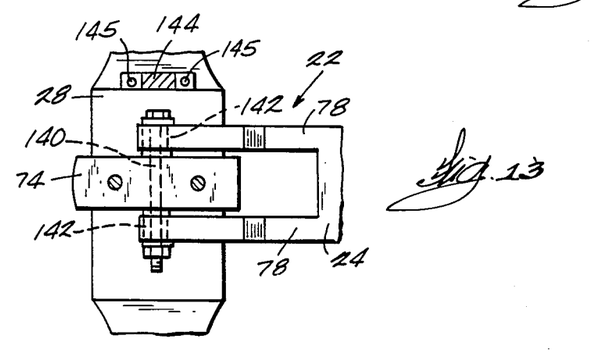
FIG. 13 is a fragmentary, sectional view taken generally along line 13—13 in FIG. 11.

FIGS. 11-13 illustrate an alternate embodiment wherein the king pin assemblies are maintained at a desired angle in the event there is relative movement between the auxiliary wheels and the vehicle frame during over-the-road travel. In this embodiment, each adapter 74 is mounted on the respective arm 22 by a bolt or pin 140 affixed to the adapter 74 and extending through bearings 142 in the extensions 78. The arm 22 pivots relative to the bracket 34 about a first transverse axis defined by the pin 32. The adapter 74 and the axle member 28 pivot relative to the arm 22 about a second transverse axis defined by the pin 140.

Each adapter 74 and the axle member 28 are pivoted relative to the respective arm 22 via an arrangement including a generally vertical link 144 having a lower end fixably mounted on the axle member 28, such as by a pair of bolts 145 (FIG. 13), and a two-piece horizontal arm 146 extending generally parallel to the horizontal leg 24 of the arm 22. Each arm 146 includes a first segment 148 having an outer end mounted on the upper end of the link 144 for relative pivotal movement about a third transverse axis defined by a bolt or pin 150 and a second segment 152 having an outer end mounted on a side member 33 of the support bracket 34 for relative pivotal movement about a fourth transverse axis defined by a bolt or pin 154.

Located in the space between the segments 142 and 152 is an actuator or air-operated cylinder 156 which serves as a shifting means. The cylinder includes a base end which is pivotally connected to the inner end of the second segment 152 at 158 and a reciprocative piston (not shown) carrying a piston rod 160 which is pivotally connected to the inner end of the first segment 148 at 162.

Pressure is selectively supplied to the base of the cylinder 156 through a conduit 164 to extend the piston rod 160 and is selectively supplied to the rod end of the cylinder 156 through a conduit 166 to retract the piston rod 160. Extension of the piston rods 166 pivots the axle member 128 and the king pin assemblies 40 relative to the arms 22 (in a counterclockwise direction as viewed in FIGS. 11 and 12) toward the forward position. Retraction of the piston rods 160 pivots the axle member 28 and the king pin assemblies 40 relative to the arms 22 (in a clockwise direction as viewed in FIGS. 11 and 12) toward the reverse position.

The pins 32, 140, 150 and 154 are positioned relative to each other so that the pivot axes defined thereby generally define a parallelogram when the axes 46 of the king pin assemblies 40 are in a neutral or vertical position, i.e., coincidental with the vertical plan 52. That is, the distance between the centers of pins 140 and 150 and the centers of pins 32 and 154 are substantially equal, as is the distance between the centers of pins 32 and 140 and the centers of pins 150 and 154. With such an arrangement, there is very little, if any, change in the angle of the king pin assemblies 40 in the event of relative movement between the axle member 28 and the vehicle frame members 14.

Operation of the air cylinders 156 can be controlled as described above to provide the desired orientation of the king pin assemblies 40.

From the foregoing description, one skilled in the art can easily ascertain the essential characteristics of the invention and, without departing from the spirit and scope thereof, make various changes and modifications to adapt it to various usages. For example, a hydraulic actuation system or an electric motor-driven system can be used to pivot the axle member between the forward and reverse positions. The king pin assemblies can be pivotally mounted on the axle member and the actuation means connected directly to the king pin assemblies to pivot them relative to the axle member. As mentioned above, the invention can be used on fixed axle assemblies spaced some distance from the drive wheels.

Also, the rear axle of the tandem drive axle on the truck 10 or a semi-tractor can made self-steerable in accordance with the invention. This axle is fixably mounted on the vehicle or trailer frame. With such an arrangement, the turning axis of the truck or tractor is the mid-point of the front drive axle and the wheels on the rear drive axle track the wheels on the front drive axle. This reduces tire wear and the turning radius of the truck or tractor.

I claim:

1. A self-steering axle assembly for a vehicle including a frame, said assembly comprising a transverse axle member extending below and supported from the vehicle frame and having opposite outer end portions;

a king pin assembly having a longitudinal axis mounted on each of said outer end portions of said axle member;

a wheel mounted on each of said king pin assemblies for rotation about a transverse axis and for steering movement;

means interconnecting said wheels so they steer together;

pivot means on said axle member for affording pivotal movement of said king pin assemblies relative to the vehicle frame between a forward position wherein the longitudinal axes of said king pin assemblies are upwardly inclined in a rearward direction at a forward angle and a reverse position wherein the longitudinal axes of said king pin assemblies are upwardly inclined in a forward direction at a reverse angle, said forward and reverse angles being less than about 30° to a vertical plane passing through the rotational axes of said wheels; and means for slectively moving said king pin assemblies between the forward and reverse positions.

2. A self-steering axle assembly according to claim 1 including means mounting said axle member on the vehicle frame for pivotal movement between an operating position wherein said wheels are in engagement with the ground and a retracted position wherein said wheels are raised above the ground; and actuation means for selectively moving said axle member between the operating and retracted positions.

3. A self-steering axle assembly according to claim 2, wherein said means mounting said axle member on the vehicle frame includes a pair of laterally spaced first arms mounted for pivotal movement about a first transverse pivot axis relative to the vehicle frame, each of said arms including a vertical leg and a generally longitudinal extending leg having an outer end portion carrying said member for relative pivotal movement about a second transverse pivot axis;

means for selectively moving said first arms between the operating and retracted positions; and stabilizing means for substantially maintaining the longitudinal axes of said king pin assemblies at a predetermined angle in the event of relative movement between said axle member and the vehicle frame during over-the road travel.

4. A self-steering axle assembly according to claim 3 wherein said actuation means and said stabilizing means comprises a two-piece, generally horizontally extending second arm including a first segment having a first inner end and an outer end mounted on said axle member for relative pivotal movement about a third transverse pivot axis vertically spaced from said first pivot axis and a second segment having a second inner end spaced from said first inner end and an outer end mounted on said vertical leg of said first arm for relative pivotal movement about a fourth transverse pivot axis vertically spaced from said second pivot axis in the same direction as said third pivot axis is spaced from said first pivot axis, said first, second, third and fourth pivot axes generally defining a parallelogram; and shifting means operably connected between said first and second inner ends of said segments for selectively moving said first and second inner ends toward and away from each other.

5. A self-steering axle assembly according to claim 4 wherein said shifting means comprises a fluid-actuated cylinder connected to one of said first and second inner ends of said segments and having a reciprocative piston operably connected to the other of said first and second ends.

6. A self-steering axle assembly according to claim 5 wherein the vehicle includes a reversible transmission which is shiftable between forward drive and reverse drive; and said switch is operable for movement to the forward position in response to shifting said transmission to a forward drive position and for movement to the reverse position in response to shifting the transmission to reverse drive.

7. A self-steering axle assembly according to claim 1 wherein said pivot means includes means supporting said axle member from the vehicle frame for pivotal movement of said axle member relative to the vehicle frame about a transverse axis; and said means for moving said king pin assemblies between the forward and reverse positions includes actuation means supported from the vehicle frame and operably connected to said axle member for pivoting said axle member in opposite directions, and motive means for moving said actuation means in a first direction to pivot said axle member in one direction and move said king pin assemblies to the forward position and for moving said actuation means in a second direction to pivot said axle member in the opposite direction and move said king pin assemblies to the reverse position.

8. A self-steering axle assembly according to claim 7 wherein said motive means includes control means having an electrical circuit for interconnecting said motive means to a source of electrical power and a selector switch connected in said electrical circuit and selectively movable between a forward position wherein said motive means moves said actuation means in the first direction and a reverse position wherein said motive means moves said actuation means in the second direction.

9. A self-steering axle assembly according to claim 8 wherein said actuation means comprises a fluid-actuated cylinder including a reciprocative piston operably connected to said axle member;

said motive means includes a source of pressurized fluid and valve means for selectively controlling the flow of pressurized fluid from said source to the opposite sides of said piston; and said control means is operably connected to said valve means to that movement of said switch to the forward position causes movement of said piston in a first direction to rotate said axle member in the first direction and movement of said switch to the reverse position causes movement of said piston in a second direction to rotate said axle member in the second direction.

10. A self-steering axle assembly according to claim 8 wherein the vehicle includes a reversible transmission which is shiftable between forward drive and reverse drive; and said switch is operable for movement to the forward position in response to shifting said transmission to forward drive and for movement to the reverse position in response to shifting the transmission to reverse drive.

11. A self-steering axle assembly according to claim 8 including a remote lever operably connected to said switch for movement of said switch between the forward and reverse positions in response to movement of said lever by an operator.

12. A self-steering axle assembly according to claim 8 wherein said control means includes a sensing means for sensing the direction of rotation of said wheels, said sensing means operably connected to said switch and operable to move said switch to the forward position in response to rotational movement of said wheels in a forward direction and to move said switch to the reverse position in response to rotational movement of said wheels in a reverse direction.

13. A self-steering axle assembly according to claim 1 wherein said forward and reverse angles are about 3° to about 15°.

14. A self-steering axle assembly for a vehicle including a frame, said assembly comprising a transverse axle member extending below and supported from the vehicle frame and having opposite outer end portions;

a king pin assembly having a longitudinal axis mounted on each of said outer end portions of said axle member;

a wheel mounted on each of said king pin assemblies for rotation about a transverse axis and for steering movement;

means interconnecting said wheels so they steer together;

means supporting said axle member from he vehicle frame for pivotal movement relative to the vehicle frame between a forward position wherein the longitudinal axes of said king pin assemblies are upwardly inclined in a rearward direction at a forward angle and a reverse position wherein the longitudinal axes of said king pin assemblies are upwardly inclined in a forward direction at a reverse angle, said forward and reverse angles being about 3° to about 15° to a vertical plane passing through the rotational axes of said wheels;

actuation means supported from the vehicle frame and operably connected to said axle member for pivoting said axle member in opposite directions;

motive means for moving said actuation means in a first direction to pivot said axle member in one direction and move said king pin assemblies to the forward position and for moving said actuation means in a second direction to pivot said axle member in the opposite direction and move said king pin assemblies to the reverse position; and control means having an electrical circuit for interconnecting said motive means to a source of electrical power and a selector switch connected in said electrical circuit and selectively movable between a forward position wherein said motive means moves said actuation means in the first direction and a reverse position to wherein said motive means moves said actuation means in the second direction.

15. A self-steering axle assembly according to claim 14 wherein said actuation means comprises a fluid-actuated cylinder including a reciprocative piston operably connected to said axle member:

said motive means includes a source of pressurized fluid and valve means for selectively controlling the flow of pressurized fluid from said source to the opposite sides of said piston; and said control means is operably connected to said valve means so that movement of said switch to the forward position causes movement of said piston in a first direction to rotate said axle member in the first direction and movement of said switch to the reverse position causes movement of said piston in a second direction to rotate said axle member in the second direction.

16. A self-steering axle assembly according to claim 15 including a remote lever operably connected to said switch for movement of said switch between the forward and reverse positions in response to movement of said lever by an operator.

17. A self-steering axle assembly according to claim 15 wherein said control means includes a sensing means for sensing the direction of rotation of said wheels, said sensing means operably connected to said switch and operable to move said switch to the forward position in response to rotational movement of said wheels in a forward direction and to move said switch to the reverse position in response to rotational movement of said wheels in a reverse direction.

18. A self-steering axle assembly according to claim 14 including means mounting said axle member on the vehicle frame for pivotal movement between an operating position wherein said wheels are in engagement with the ground and a retracted position wherein said wheels are raised above the ground; and means for moving said axle member between the operating and retracted positions.

* * * * *